United States Patent
Burris et al.

(10) Patent No.: US 9,766,906 B2
(45) Date of Patent: Sep. 19, 2017

(54) EFFICIENT SHARING OF ARTIFACTS BETWEEN COLLABORATION APPLICATIONS

(75) Inventors: Thomas J. Burris, Newton, MA (US); Manish Kataria, Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1350 days.

(21) Appl. No.: 13/339,883

(22) Filed: Dec. 29, 2011

(65) Prior Publication Data
US 2013/0173700 A1 Jul. 4, 2013

(51) Int. Cl.
*G06F 15/16* (2006.01)
*G06F 9/445* (2006.01)

(52) U.S. Cl.
CPC .................................. *G06F 9/445* (2013.01)

(58) Field of Classification Search
CPC ................................. G06F 9/445; G06F 17/00
USPC .................................. 709/203, 204; 707/102
See application file for complete search history.

(56) References Cited

U.S. PATENT DOCUMENTS

| | | | |
|---|---|---|---|
| 5,535,319 A | 7/1996 | Pascoe et al. | |
| 5,737,495 A | 4/1998 | Adams et al. | |
| 5,914,951 A | 6/1999 | Bentley et al. | |
| 5,933,835 A | 8/1999 | Adams et al. | |
| 6,473,794 B1 | 10/2002 | Guheen et al. | |
| 6,606,744 B1 | 8/2003 | Mikurak | |
| 7,039,597 B1 | 5/2006 | Notani et al. | |
| 7,162,699 B1 | 1/2007 | Pena-Mora et al. | |
| 7,222,269 B2 | 5/2007 | Kurinami et al. | |
| 7,400,423 B2 | 7/2008 | Hara | |
| 7,788,319 B2 | 8/2010 | Schmidt et al. | |
| 7,840,673 B1 | 11/2010 | O'Crowley | |
| 8,116,729 B2 | 2/2012 | Chow et al. | |
| 2003/0037175 A1* | 2/2003 | Kravtchenko et al. | 709/313 |
| 2003/0110421 A1 | 6/2003 | Kurinami et al. | |
| 2005/0044104 A1* | 2/2005 | Kaneda et al. | 707/102 |
| 2009/0138808 A1 | 5/2009 | Moromisato et al. | |
| 2009/0210444 A1 | 8/2009 | Bailey et al. | |
| 2009/0248700 A1 | 10/2009 | Amano et al. | |
| 2009/0282090 A1 | 11/2009 | Hamilton, II et al. | |
| 2010/0042720 A1 | 2/2010 | Stienhans et al. | |
| 2010/0057422 A1 | 3/2010 | Ebata et al. | |
| 2010/0169477 A1 | 7/2010 | Stienhans et al. | |

(Continued)

FOREIGN PATENT DOCUMENTS

DE 102012223167 A1 7/2013

OTHER PUBLICATIONS

"Product Tour," [online] InfoGate Solutions, [retrieved Jul. 21, 2011] retrieved from the Internet: <http://www.infogatesolutions.com/index-5.html>, 2 pgs.

(Continued)

*Primary Examiner* — Farid Homayounmehr
*Assistant Examiner* — Suman Debnath
(74) *Attorney, Agent, or Firm* — Cuenot, Forsythe & Kim, LLC

(57) ABSTRACT

A method can include evaluating each of a plurality of collaborative systems, using a processor, for suitability hosting an artifact according to at least one attribute of the artifact. A first collaborative system can be selected from the plurality of collaborative systems according to the evaluation. The artifact can be stored in the first collaborative system.

12 Claims, 4 Drawing Sheets

(56) References Cited

U.S. PATENT DOCUMENTS

| | | |
|---|---|---|
| 2010/0178864 A1 | 7/2010 | Chow et al. |
| 2010/0192072 A1 | 7/2010 | Spataro et al. |
| 2010/0223671 A1 | 9/2010 | Tsuda |
| 2010/0262663 A1 | 10/2010 | Andrews et al. |
| 2010/0287246 A1 | 11/2010 | Klos et al. |
| 2010/0318619 A1 | 12/2010 | Meijer |
| 2011/0010332 A1 | 1/2011 | Vasudevan et al. |
| 2011/0055329 A1 | 3/2011 | Abt, Jr. et al. |
| 2011/0055398 A1 | 3/2011 | Dehaan et al. |
| 2011/0083167 A1 | 4/2011 | Carpenter et al. |
| 2011/0107231 A1 | 5/2011 | Gueldemeister |
| 2013/0173703 A1 | 7/2013 | Burris et al. |

OTHER PUBLICATIONS

"A New Collaboration Experience," [online] Cisco Systems, Inc., 2011, [retreived Apr. 20, 2011] retrieved from the Internet: <http://www.cisco.com/en/US/solutions/collateral/ns1007/C45-564016-00_A_New_Collaboration_Experience_AAG_v7b.pdf>, 2 pgs.

Schmotzer, K., et al., "IBM LotusLive: A Social Networking and Collaboration Platform for the Midmarket," [online] IBM Corporation, REDP-4728-00, Mar. 23, 2011 [retrieved Mar. 23, 2011] retrieved from the Internet: <http://www.redbooks.ibm.com/redpapers/pdfs/redp4728.pdf>, 12 pgs.

Worlock, P., "Working Together," [online] softwareknowhow.info, Grey Matter, Ltd., Jan. 5, 2011, [retrieved Jul. 23, 2011] retrieved from the Internet: <http://www.softwareknowhow.info/Buyers-Guide/Working-together/301>, 6 pgs.

Joshi, S.D., et al., "A Method and System for Dynamically Switching Between Collaboration Mediums," IBM Corporation, [online] IP.com, Feb. 15, 2010 [retrieved Dec. 16, 2011] retrieved from the Internet: <http://ip.com/IPCOM/000193228> 4 pgs.

U.S. Appl. No. 13/561,879, Non-final Office Action, Apr. 21, 2014, 13 pg.

U.S. Appl. No. 13/561,879, Non-Final Office Action, Nov. 24, 2014, 12 pg.

\* cited by examiner

EFFICIENT SHARING OF ARTIFACTS BETWEEN COLLABORATION APPLICATIONS

BACKGROUND

One or more embodiments disclosed within this specification relate to collaborative systems.

Collaborative systems are often used within organizations to improve communication and efficiency. Organizations have also started to use collaborative systems to interact with customers. Typically, for purposes of security, the collaborative systems utilized within an organization are separate and independent from the collaborative systems used to interact with customers. For example, a collaborative system that is accessible by members of the organization can be located "behind" a firewall of the organization, whereas a collaborative system used to interact with customers is not.

In many instances, it is desirable to make information available on two or more collaborative systems, e.g., on a collaborative system internal to an organization accessible only by members of the organization and also on a collaborative system that is accessible by non-members of the organization. To accomplish this task, the information that is to be made available must be manually uploaded to each collaborative system independently. As the information changes, the changes must be manually implemented on each collaborative system. Maintaining up-to-date information across multiple collaborative systems can be a laborious task.

BRIEF SUMMARY

One or more embodiments disclosed within this specification relate to collaborative systems.

One embodiment can include a method of processing an artifact. The method can include evaluating each of a plurality of collaborative systems, using a processor, for suitability hosting an artifact according to at least one attribute of the artifact. A first collaborative system can be selected from the plurality of collaborative systems according to the evaluation. The artifact can be stored in the first collaborative system.

Another embodiment can include a method of processing an artifact. The method can include associating an artifact with a plurality of users and determining each collaborative system from a plurality of collaborative systems to which each of the plurality of users is registered for access as a candidate collaborative system. A first collaborative system can be selected from the candidate collaborative systems. The artifact can be stored in the first collaborative system.

Another embodiment can include a system for processing an artifact. The system can include a processor configured to initiate executable operations as described within this specification.

Another embodiment can include a computer program product for processing an artifact. The computer program product can include a computer readable storage medium having computer readable program code embodied therewith. The computer readable program code can be configured to implement or initiate the various operations described within this specification.

DETAILED DESCRIPTION

Figure 1:
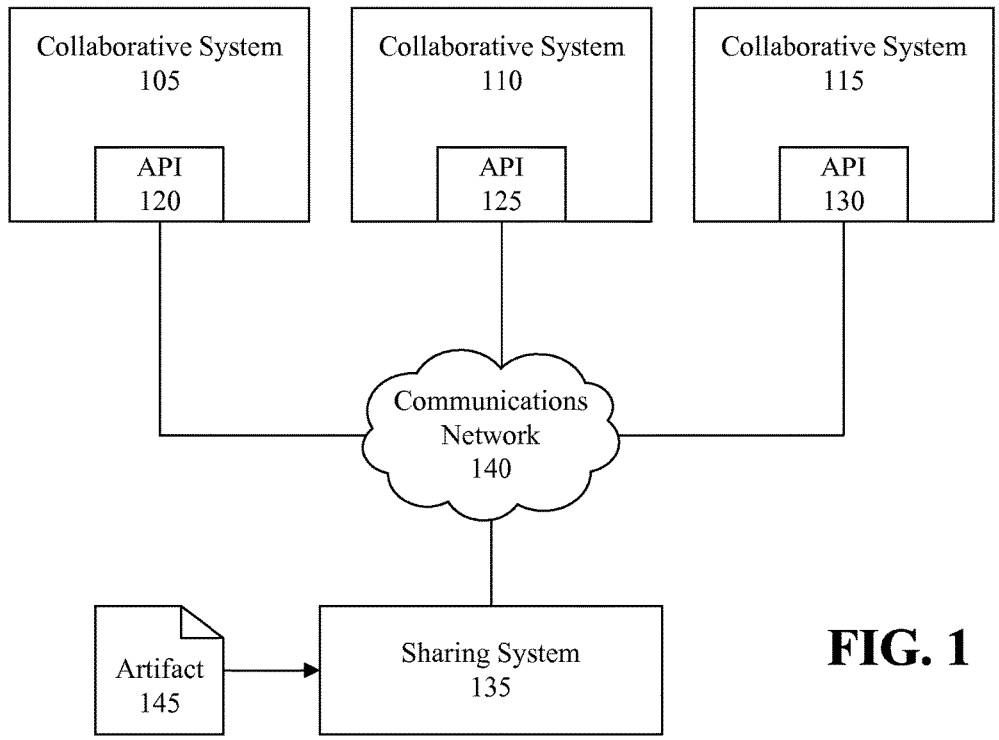
FIG. 1 is a block diagram illustrating a system for sharing artifacts between collaborative systems in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to collaborative systems. In accordance with the inventive arrangements disclosed within this specification, the determination of which of a plurality of different collaborative systems is suited to host an artifact can be performed automatically. An "artifact," as used within this specification, can refer to a digital object or asset. An artifact, for example, can be a file such as a document, whether a text file, a presentation, or the like, a multimedia file, an audio file, a video file, etc.

One or more attributes of an artifact to be hosted within a collaborative system can be evaluated. A plurality of collaborative systems also can be evaluated with respect to the attributes of the artifact and one or more characteristics of each collaborative system under consideration. A collaborative system that is suited to host the artifact can be selected based upon the evaluation.

Accordingly, the artifact can be automatically uploaded or stored on the selected collaborative system. In some cases, links to the artifact can be created on one or more other collaborative systems, thereby reducing the computing resources otherwise consumed by making the artifact available via more than one collaborative system. Other aspects of the one or more embodiments disclosed within this specification will be apparent from the following description in conjunction with the Figures.

FIG. 1 is a block diagram illustrating a system for sharing artifacts between collaborative systems in accordance with an embodiment disclosed within this specification. As shown, FIG. 1 illustrates collaborative systems 105, 110, and 115. Each of collaborative systems 105-115 can include an application programming interface (API) through which one or more other users and/or systems can interact. Collaborative system 105 includes API 120. Collaborative system 110 includes API 125. Collaborative system 115 includes API 130.

In general, a "collaborative system" refers to a combination of one or more data processing systems executing suitable computer program code, e.g., a collaborative application, that allows more than one user involved in a given task to work together towards the completion of that task. The collaborative system allows the group of users involved in the task to collaborate, i.e., work together, by sharing one or more artifacts relating to the task, communicating with one another, and the like. In some cases, the collaborative system can provide project management functions such as task assignment, time-management of deadlines, and shared calendars. Examples of collaborative systems can include LotusLive™ and IBM Connections, both of which are available from International Business Machines Corporation of Armonk, N.Y. Other examples of collaborative systems can include Wikis, online meeting spaces, online forums, etc., where membership or access to a collaborative space within the collaborative system can be restricted to a defined and/or limited set of users registered with the collaborative system.

As used within this specification, a "collaborative space" can refer to an area, e.g., a logical area or a virtual area, or environment defined within a collaborative system in which artifacts can be stored or hosted. Each collaborative space can be associated with one or more users registered with the collaborative system in which the collaborative space is located. Users associated with a collaborative space are granted access to the collaborative space. Each collaborative space within a collaborative system can be associated with a different combination of users that is independently specifiable from each other collaborative space in the collaborative system. Typically, the users granted access to a collaborative space will be a subset of the users registered with the collaboration system.

A sharing system 135 can be communicatively linked with each of collaborative systems 105-115 via a communications network (network) 140. Network 140 can be implemented as a wireless network, a wired network, a public network, a private network, or any combination thereof. In general, a user, such as an owner of an artifact 145 to be hosted on one of collaborative system 105-115, can interact with sharing system 135. For example, sharing system 135 can provide a user interface, e.g., a graphical user interface (GUI), through which the owner of artifact 145 can communicate.

In one aspect, an owner of artifact 145, e.g., a user, can identify artifact 145 to sharing system 135 via the user interface. Sharing system 135 can be configured to automatically determine the most suitable one of collaborative systems 105-115 to host artifact 145. The selection of a particular one of the collaborative systems 105-115 can be performed according to an evaluation of attributes of artifact 145, an evaluation of characteristics of collaborative systems 105-115, and/or a comparison of the attributes and characteristics. Having selected a collaborative system, sharing system 135 can interact with the selected collaborative system via the API of that collaborative system to upload artifact 145.

For purposes of illustration, consider the case in which sharing system 135 automatically selects collaborative system 105 to host the artifact. Sharing system 135 can be registered with each collaborative systems 105-115 thereby allowing sharing system, acting via API 120, to create any objects, e.g., documents, activities, discussion entries, etc., that may be required in collaborative system 105 to host artifact 145. For example, sharing system 135 can instruct collaborative system 105 to create a collaborative space in which artifact 145 is stored and with which users intended to access artifact 145 are provided access.

Figure 2:
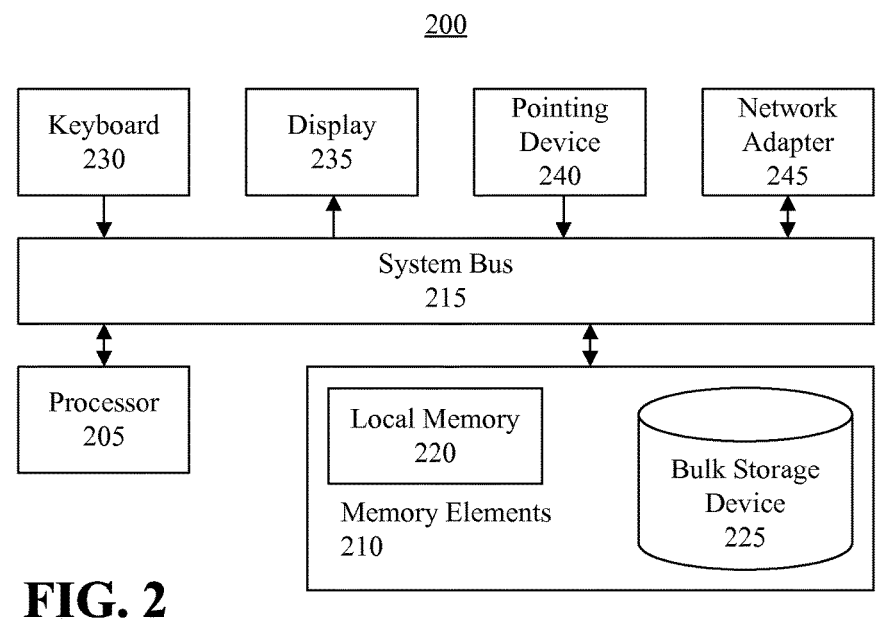
FIG. 2 is a block diagram illustrating an example of a data processing system.

FIG. 2 is a block diagram illustrating an example of a data processing system 200. Collaborative systems 105-115 and sharing system 135, for example, each can be implemented using a data processing system or a plurality of communicatively linked data processing systems as illustrated in FIG. 2.

System 200 can include at least one processor 205 coupled to memory elements 210 through a system bus 215. As such, system 200 can store program code, e.g., a collaborative application or a sharing system application, within memory elements 210. Processor 205 can execute the program code accessed from memory elements 210 via system bus 215. In one aspect, for example, system 200 can be implemented as computer that is suitable for storing and/or executing program code. It should be appreciated, however, that system 200 can be implemented in the form of any system including a processor and memory that is capable of performing the functions described within this specification.

Memory elements 210 can include one or more physical memory devices such as, for example, local memory 220 and one or more bulk storage devices 225. Local memory 220 refers to random access memory or other non-persistent memory device(s) generally used during actual execution of the program code. Bulk storage device(s) 225 can be implemented as a hard drive or other persistent data storage device. System 200 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 200. The I/O devices can be coupled to system 200 either directly or through intervening I/O controllers. Network adapter 245 also can be coupled to system 200 to enable system 200 to become coupled to other systems, computer systems, remote printers, and/or remote storage devices through intervening private or public networks. Modems, cable modems, and Ethernet cards are examples of different types of network adapter 245 that can be used with system 200.

As noted, memory elements 210 can store a collaborative application in the case of a collaborative system thereby configuring system 200 to perform the various functions and/or operations described within this specification for a collaborative system. In another aspect, memory elements 210 can store a sharing application in the case of a sharing system thereby configuring system 200 to perform the various functions and/or operations described within this specification for a sharing system.

Figure 3:
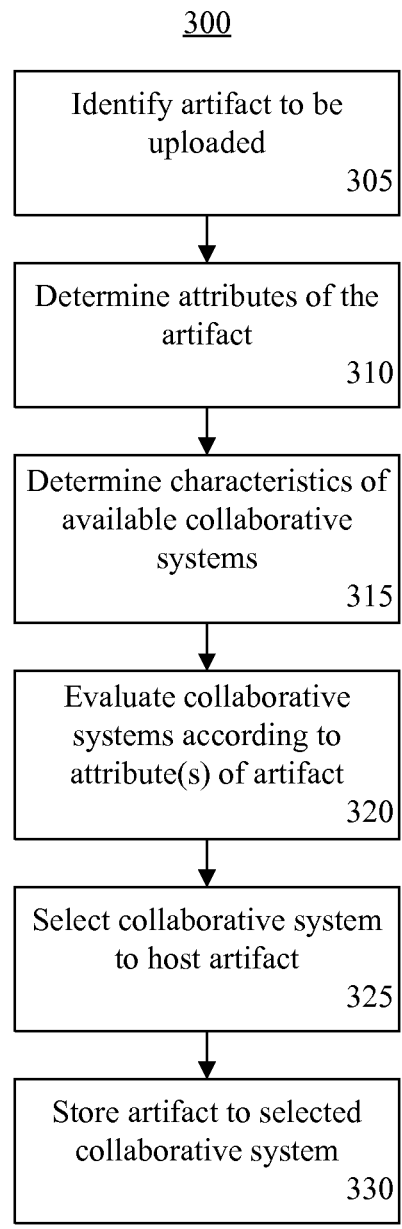
FIG. 3 is a flow chart illustrating a method sharing artifacts between collaborative systems in accordance with another embodiment disclosed within this specification.

FIG. 3 is a flow chart illustrating a method 300 sharing artifacts between collaborative systems in accordance with another embodiment disclosed within this specification. Method 300 illustrates an automated method for selecting a particular collaborative system from a plurality of collaborative systems to host an artifact. Method 300 can be performed by sharing system 135 as described with reference to FIGS. 1 and 2 of this specification.

In step 305, the sharing system can identify an artifact to be hosted by a collaborative system. For example, a user such as an owner of the artifact can interact with a user interface of the sharing system to specify the artifact. In step 310, the sharing system can determine one or more attributes of the identified artifact. Examples of attributes of the artifact can include, but are not limited to, the type of the file, e.g., an extension of the file, the size of the file, whether the file is a media file to be played via the collaborative site hosting the artifact, the number of users intended to access the artifact, etc.

In another aspect, attributes of the artifact can include a list of users that are to have access to the artifact once loaded into a collaborative system. For example, the sharing system can determine one or more users that are to have access to the artifact once hosted in a particular collaborative system. The owner of the artifact can specify one or more other users that are to have access, e.g., read or write access, to the artifact when hosted by a collaborative system. Such information can be provided by the owner through the user interface used to specify the artifact. Each user that is identified can be one that is registered with the sharing system and with one or more collaborative systems available to host the artifact.

In step 315, the sharing system can determine one or more characteristics of each of a plurality of collaborative systems that are available to host the artifact. In one aspect, the sharing system can include a list of collaborative systems available to host the artifact. The list can specify known characteristics of the each collaborative system. Some characteristics can be static such as, for example, the cost of storing a unit of data on the collaborative system. Other characteristics can be dynamic in that the characteristics change over time and are determined by a query from the sharing system to the applicable collaborative system. As such, the sharing system must query the collaborative system(s) in order to determine the current state or value of the characteristic. An example of a dynamic characteristic of a collaborative system can include the amount of long term (e.g., persistent or non-transient storage) such as disk space available or unused.

Another example of a characteristic that can be static or dynamic depending upon the particular collaborative system can be which users are registered with, and able to access, the collaborative system. For example, the sharing system can query each collaborative system on the list to determine whether each of the users associated with the artifact is registered with the collaborative system and, as such, would be able to access the artifact if hosted on the collaborative system. In another example, the characteristics can include whether the owner of the artifact has write access to the collaborative system. In this regard, any collaborative systems to which the owner does not have write access can be excluded from consideration for hosting the artifact.

Consider the case in which the users intended to access the artifact once hosted in a collaborative system have different rights from one collaborative system to the next. Some users, for instance, can be employees of an organization with access to an internally available collaborative system that is protected within a firewall or other network security measure of the organization, while other users are not employees and do not have access to the internally available collaborative system. For example, the non-employee users can have access to a publicly available collaborative system that is located external to the firewall. Thus, it may be the case that one or more users intended to have access to the artifact are registered users of collaborative systems 1 and 3, whereas one or more other users that also are intended to have access to the artifact are registered with collaborative systems 2 and 3.

In step 320, the sharing system can evaluate the collaborative systems on the list according to the attribute(s) of the artifact that is to be hosted. The evaluation can be performed using any of a variety of techniques. In one aspect, scoring techniques can be used in which each collaborative system is scored for suitability considering one or more or all of the attributes of the artifact and characteristics of the collaborative systems. For example, an administrator of the sharing system can set scoring parameters that can be used to rank the collaborative systems in terms of suitability for hosting the artifact given the attributes of the artifact. In another aspect, techniques can be used in which the collaborative systems from the list are continually narrowed or reduced by applying one criteria or performing one comparison at a time.

In one example, the list of collaborative systems can be evaluated first to determine a subset of collaborative systems from the list with which each of the users associated with the artifact is registered and, as such, is able to access the artifact if hosted on the collaborative system. Collaborative systems that do not meet this criterion can be eliminated from consideration or eliminated from the list of available collaborative systems considered for hosting the artifact. Referring to the prior example, only collaborative system 3 would be available for hosting the artifact.

In another example, using a comparison of the attributes of the artifact with the characteristics of the collaborative systems, a subset of collaborative systems from the list can be determined that have characteristics matching the attributes of the artifact in terms of available resources needed to host the artifact, e.g., sufficient persistent storage, or sufficient persistent storage that is lowest in cost, etc. In another example, load balancing can be considered where the current load on each collaborative system is used as a dynamically determined characteristic by the sharing system to select a collaborative system currently having a lower load than others.

As noted, the evaluation can consider each of the attributes and/or characteristics concurrently or one at a time. For example, the list of collaborative systems can be narrowed to a first subset in which each collaborative system is able to provide access to each user associated with the artifact. The list of collaborative systems can be further narrowed to a second subset of those that have sufficient computing resources to host the artifact. The list of collaborative systems can be further narrowed to a third subset in which the "N" most cost effective collaborative systems are selected for hosting the artifact, where "N" is an integer value that can be a sharing system preference.

In step 325, the sharing system can select the collaborative system of those considered that is most, or best, suited to hosting the artifact based upon the evaluation performed in step 320. The collaborative system that is selected can be the collaborative system remaining, e.g., the one that has not been eliminated from consideration or can be the collaborative system having the highest score from the evaluation when two or more collaborative systems remain viable candidates, e.g., have not been eliminated.

In step 330, the sharing system can store the artifact in the selected collaborative system. In storing, or uploading, the artifact to the selected collaborative system, the sharing system can create any necessary and/or appropriate objects that may be required within the selected collaborative system. For example, the sharing system can first create a collaborative space, e.g., a discussion thread or space, activity, task, etc., within the selected collaborative system where each user associated with the artifact is specified as an authorized user for the collaborative space created. The sharing system then can store or otherwise associate the artifact with the created collaborative space.

It should be appreciated that the sharing system, being capable of communicating with each of the collaborative systems considered for hosting the artifact via the API of each respective collaborative system can be configured to provide the instructions or information necessary to effectuate the actions described. The sharing system can perform the operations necessary to cause each collaborative system to host the artifact despite the operations, e.g., commands and/or syntax of the operations, being different from one collaborative system to the next.

Having selected a collaborative system and issued instructions to cause the collaborative system to host the artifact, the sharing system can maintain a record of the transactions performed that specifies, for example, the artifact, the location of the artifact (e.g., a uniform resource identifier (URI) or a uniform resource locator (URL)), the users associated with the artifact, etc.

Figure 4:
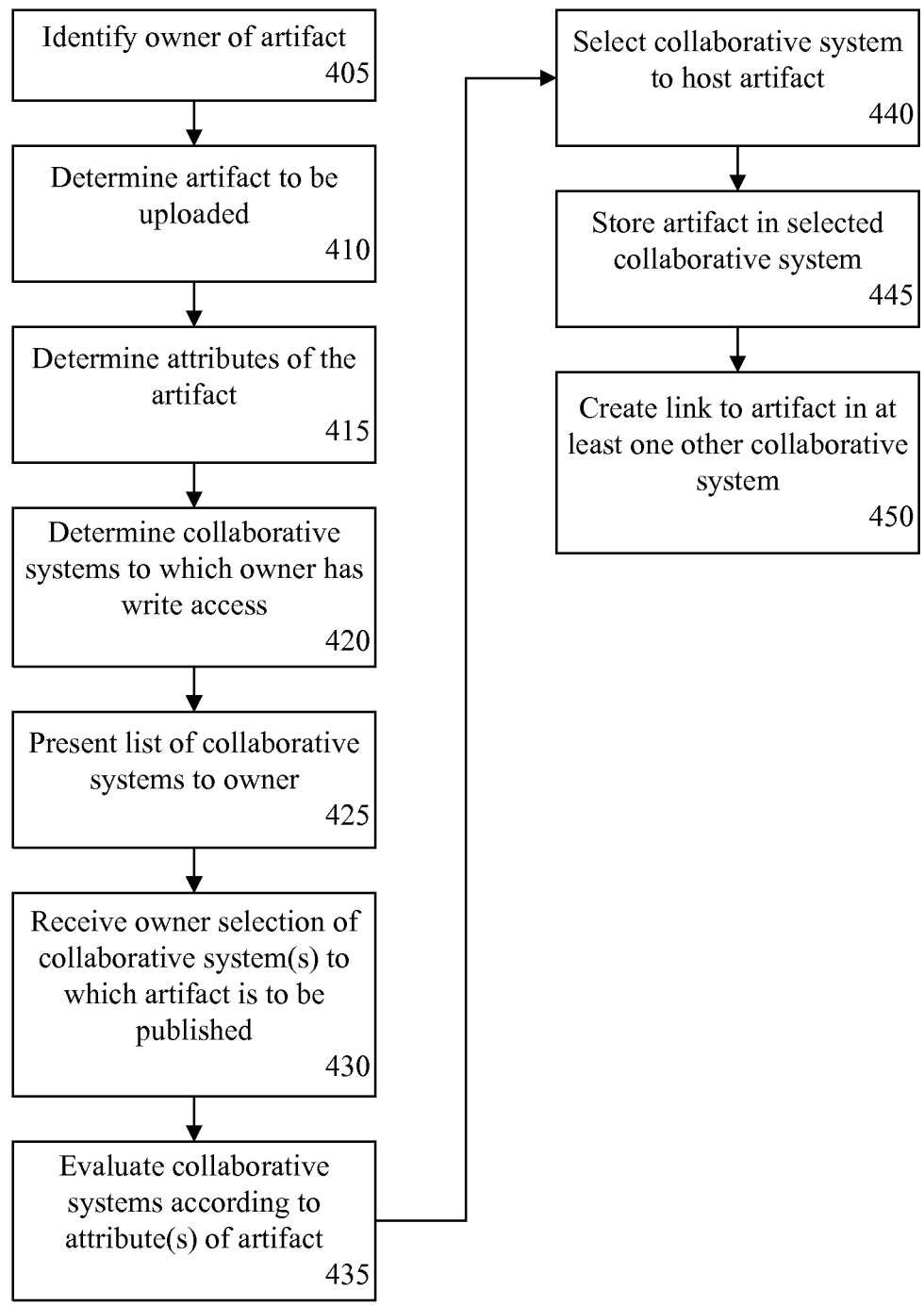
FIG. 4 is a flow chart illustrating a method of sharing artifacts between collaborative systems in accordance with another embodiment disclosed within this specification.

FIG. 4 is a flow chart illustrating a method 400 of sharing artifacts between collaborative systems in accordance with another embodiment disclosed within this specification. Method 400 illustrates a method of selecting a collaborative system for hosting an artifact from a plurality of collaborative systems. Method 400 can be performed by sharing system 135 as described with reference to FIGS. 1 and 2 of this specification.

In step 405, the sharing system can identify the owner of the artifact to be hosted. For example, the owner can log into the sharing system. In step 410, the sharing system can determine the artifact that is to be uploaded, e.g., by the owner indicating the artifact via a user interface. In step 415, the sharing system can determine one or more attributes for the artifact, e.g., file type, size, users to access the artifact, etc.

In step 420, the sharing system can determine the particular collaborative systems to which the owner has access. For example, the sharing system can be configured to include a list of registered users where the list further indicates which collaborative system(s) of those registered with the sharing system that each user has access and the type of access, e.g., read, write, etc. In another example, the sharing system can determine the collaborative systems to which the owner has write access by querying each collaborative system registered with the sharing system for such information. Collaborative systems in which the owner has write access can be considered candidates for hosting the artifact. In step 425, the sharing system can present, e.g., display, a list of collaborative systems to which the owner has write access. The list of collaborative systems to which the owner has write access can be presented to the owner to solicit a response.

In step 430, the sharing system can receive an input from the owner indicating which of the collaborative systems presented in step 425 through which the owner would like the artifact to be published. As used within this specification, "published" can mean that the artifact is available via a collaborative system that is publishing the artifact. The artifact can, but need not, be stored or hosted on a collaborative system through which the artifact is published.

In step 435, the sharing system can evaluate the collaborative systems selected by the owner according to the attributes of the artifact and/or any characteristics of the collaborative systems as previously described. In step 440, the sharing system can select a collaborative system for hosting the artifact according to the evaluation performed in step 435. In step 445, the sharing system can store the artifact in the selected, e.g., a "first," collaborative system.

In step 450, the sharing system can create or post a link, e.g., a soft link, to the artifact hosted in the first collaborative system within one or more other, e.g., second, collaborative systems. For example, in cases where no single collaborative system is able to provide each user associated with the artifact access to the hosted artifact, the artifact can be hosted in a selected collaborative system and the sharing system can post a link to the artifact in one or more other collaborative systems. In this regard, the artifact can be published to more than one collaborative system automatically by the sharing system.

The sharing system can identify a collaborative system, e.g., a second collaborative system, that provides access to one or more or all of the users unable to access the first collaborative system selected to host the artifact. The sharing system can post a link to the artifact within the second collaborative system. Posting a link rather than another instance of the artifact within the second collaborative system helps to avoid unnecessary computing resource usage across multiple collaborative systems.

In creating a link, the sharing system can create any necessary and/or appropriate objects that may be required within the second collaborative system. For example, the sharing system can first create a collaborative space, e.g., a discussion thread or space, activity, task, etc., within the selected collaborative system where one or more or all users associated with the artifact are specified as authorized users for the collaborative space that is created. In one aspect, only users that are registered with the second collaborative system, but not the first collaborative system, can be designated as authorized users for the collaborative space created to store the link in the second collaborative system.

For example, when the owner selects two collaborative systems to which the artifact is to be published, the sharing system can choose a first of the collaborative systems to host the artifact, e.g., the collaborative system determined to be best suited, and a second of the collaborative systems to which a link to the artifact can be posted.

The sharing system also can be configured to mediate access from the collaborative system in which a link to the artifact is posted (e.g., the link collaborative system) to the collaborative system hosting the artifact (e.g., the hosting collaborative system). For example, responsive to a user selection of the link in the link collaborative system, the link collaborative system can initiate a request to the sharing system to retrieve the artifact. The sharing system, which has credentials to access both the hosting collaborative system and the link collaborative system, can determine that the request originated from a user associated with the requested artifact and from the link collaborative system. The sharing system can determine the artifact requested from the selected link, locate the artifact within the hosting collaborative system, e.g., locate the URI or URL stored in the sharing system for the artifact, retrieve a copy of the artifact from the hosting collaborative system, and provide the artifact to the requesting user that initially selected the link from the link collaborative system.

Figure 5:
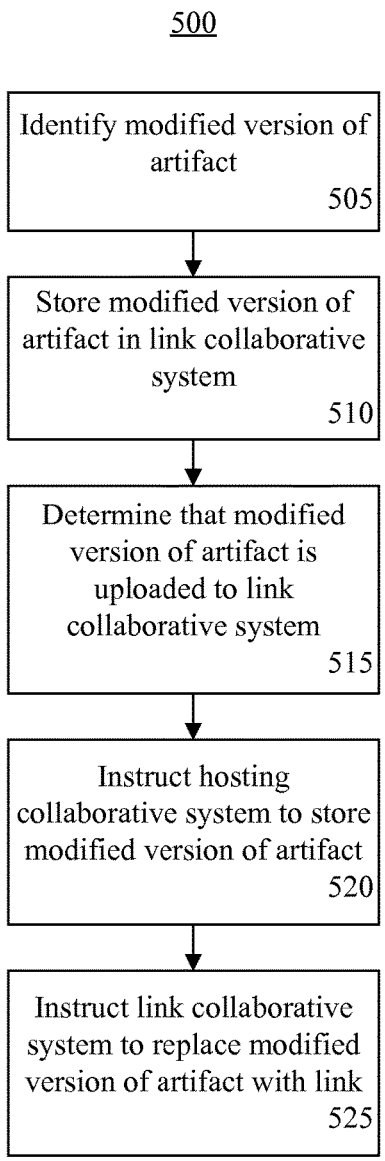
FIG. 5 is a flow chart illustrating a method of sharing artifacts between collaborative systems in accordance with another embodiment disclosed within this specification.

FIG. 5 is a flow chart illustrating a method 500 of sharing artifacts between collaborative systems in accordance with another embodiment disclosed within this specification. More particularly, method 500 illustrates a method propagating information between collaborative systems relating to an artifact. Method 500 can be performed by sharing system 135 as described with reference to FIGS. 1 and 2 of this specification.

Method 500 can begin in a state where an artifact is hosted in a hosting collaborative system and a link to the artifact is posted in a link collaborative system. A user with access to the link collaborative system has accessed the artifact and modified the artifact in some way. Accordingly, the user wishes to provide feedback in the form of an edited version of the artifact back to one or more other users associated with the artifact that have access to the hosting collaborative system.

In step 505, the link collaborative system can identify a modified version of the artifact. For example, a user can interact with the link collaborative system to specify a modified version of the artifact through a user interface for uploading to the link collaboration system. In step 510, the link collaborative system can store a copy of the modified version of the artifact in the collaborative space in which the link to the artifact is posted.

In step 515, the sharing system can determine that a modified version of the artifact has been uploaded to the collaborative space. In one aspect, the sharing system can be configured to query each collaborative system that is hosting either the artifact or a link thereto, for changes to the collaborative space in which the link or the artifact is stored from time to time or periodically. In another aspect, the sharing system can be registered with the link collaborative system, e.g., as a user of the collaborative space to which the modified version of the artifact is uploaded, to receive a notification responsive to any changes to the collaborative space.

In step 520, the sharing system can instruct the hosting collaborative system to store a copy of the modified version of the artifact in the collaborative space in which the artifact is stored. In step 525, the sharing system can instruct the link collaborative system to replace the modified version of the artifact with a link to the modified version of the artifact now hosted in the hosting collaborative system. The modified version of the artifact, for example, can be removed or otherwise deleted from the link collaborative system so that only a single instance of the modified version of the artifact is maintained across each collaborative system providing access of some form to the artifact or modified versions of the artifact.

In performing the various operations described herein, the sharing system can be configured to store a record of the different transactions, e.g., functions, operations, instructions, etc. communicated to and/or from each of the collaborative system. In this regard, the sharing system can maintain historical records of actions performed allowing automation of tasks as described with reference to FIG. 5, for example, to occur without user intervention. The sharing system, for example, can maintain a record of the particular collaborative system and collaborative space hosting the artifact, which collaborative systems and collaborative spaces are hosting links to each artifact, and update the records as new operations are transacted are performed.

Figure 6:
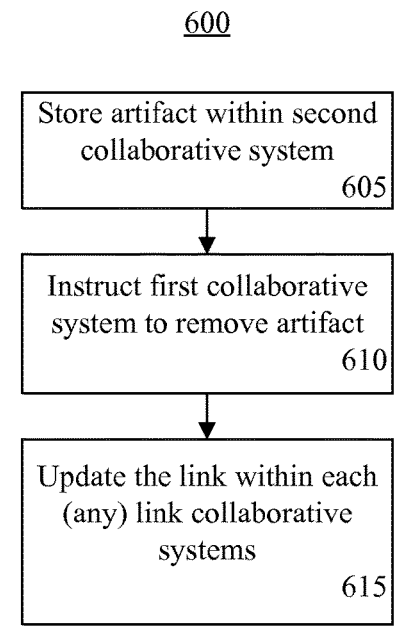
FIG. 6 is a flow chart illustrating a method of sharing artifacts between collaborative systems in accordance with another embodiment disclosed within this specification.

FIG. 6 is a flow chart illustrating a method 600 of sharing artifacts between collaborative systems in accordance with another embodiment disclosed within this specification. More particularly, method 600 illustrates a method of dynamically, e.g., automatically, updating an artifact responsive to changes to one or more attributes of the artifact. Method 600 can be performed by sharing system 135 as described with reference to FIGS. 1 and 2 of this specification.

Method 600 can begin in a state in which an owner of an artifact hosted within a first collaborative system changes an attribute of the artifact. For example, the owner can add or remove a user to the list of users granted access to the artifact. For purposes of illustration, consider the case in which responsive to modifying an attribute of the artifact, the sharing system determines that a different collaborative system is better suited to host the artifact than a first collaborative system in which the artifact is currently hosted.

In step 605, the sharing system can store the artifact within a second collaborative system determined better suited to host the artifact. As noted, the sharing system can instruct the second collaborative system to generate any objects necessary for hosting the artifact.

In step 610, the sharing system can instruct the first collaborative system to remove or delete the artifact. In some cases, the sharing system can determine that the first collaborative system, in order to continue providing access to each user associated with the artifact, should include a link to the artifact. In that case, the artifact can be replaced with a link to the artifact now hosted in the second collaborative system. In other cases, the first collaborative system may no longer be needed. In that case, the sharing system can instruct the first collaborative system to purge the entire collaborative space associated with the artifact.

In step 615, the sharing system can communicate with each link collaborative system to update the link that pointed to the first collaborative system to the location of the artifact now hosted in the second collaborative system.

The one or more embodiments disclosed within this specification relieve the owner of an artifact from having to determine the proper collaborative system to host an artifact. Further, the owner is relieved from having to update a plurality of different collaborative systems with changes to artifacts over time in order to continue to provide access to the artifact, or the most recent version of an artifact, through the plurality of different collaborative systems.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for processing an artifact, the system comprising:
   a hardware storage device having stored therein computer readable program code; and
   a hardware processor configured to execute the following operations found within the computer readable program code:
   evaluating each of a plurality of collaborative systems for suitability hosting an artifact according to at least one attribute of the artifact;
   selecting a first collaborative system from the plurality of collaborative systems according to the evaluation; and
   storing the artifact in the first collaborative system, wherein
   the evaluating each of the plurality of collaborative systems includes determining which of a plurality of users intended to access the artifact are registered with each of the plurality of collaborative systems.

2. The system of claim 1, wherein evaluating each of the plurality of collaborative systems comprises:
   determining at least one computing resource needed to host the artifact; and
   comparing the at least one computing resource needed to host the artifact with computing resources available in each of the plurality of collaborative systems,
   wherein the first collaborative system is selected according to availability of the computing resource needed to host the artifact.

3. The system of claim 1, wherein the hardware processor is further configured to initiate an executable operation comprising:
   automatically creating a link within a second collaborative system different from the first collaborative system pointing to the artifact in the first collaborative system.

4. The system of claim 1, wherein the hardware processor is further configured to initiate executable operations comprising:
   limiting the plurality of collaborative systems from which the first collaborative system is selected to collaborative systems to which an owner of the artifact has write access.

5. The system of claim 4, wherein the hardware processor is further configured to initiate an executable operation comprising:
   receiving a user input selecting at least two of the collaborative systems to which the owner has write access; and
   further limiting the plurality of collaborative systems to the at least two of the collaborative systems selected by the user input.

6. The system of claim 1, wherein the hardware processor is further configured to initiate an executable operation comprising:
   responsive to a change to the at least one attribute of the artifact:
   evaluating each of the plurality of collaborative systems for suitability hosting the artifact according to the change to the at least one attribute of the artifact;
   selecting a second collaboration system to host the artifact;
   removing the artifact from the first collaborative system; and
   uploading the artifact to the second collaborative system.

7. A computer program product, comprising:
   a hardware storage device having stored therein computer readable program code for processing an artifact,
   the computer readable program code, which is executed by a computer hardware system to causes the computer hardware system to perform:
   evaluating each of a plurality of collaborative systems for suitability hosting an artifact according to at least one attribute of the artifact;
   selecting a first collaborative system from the plurality of collaborative systems according to the evaluation; and
   storing the artifact in the first collaborative system, wherein
   the evaluating each of the plurality of collaborative systems includes determining which of a plurality of users intended to access the artifact are registered with each of the plurality of collaborative systems.

8. The computer program product of claim 7, wherein the computer readable program code comprises:
   computer readable program code configured to determine at least one computing resource needed to host the artifact; and
   computer readable program code configured to compare the at least one computing resource needed to host the artifact with computing resources available in each of the plurality of collaborative systems,
   wherein the first collaborative system is selected according to availability of the computing resource needed to host the artifact.

9. The computer program product of claim 7, further comprising:
   computer readable program code configured to automatically create a link within a second collaborative system different from the first collaborative system pointing to the artifact in the first collaborative system.

10. The computer program product of claim 7, further comprising:
    computer readable program code configured to limit the plurality of collaborative systems from which the first collaborative system is selected to collaborative systems to which an owner of the artifact has write access.

11. The computer program product of claim 7, further comprising:
    computer readable program code configured to receive a user input selecting at least two of the collaborative systems to which the owner has write access; and
    computer readable program code configured to further limit the plurality of collaborative systems to the at least two of the collaborative systems selected by the user input.

12. The computer program product of claim 7, further comprising:
    responsive to a change to the at least one attribute of the artifact, computer readable program code configured to:
    evaluate each of the plurality of collaborative systems for suitability hosting the artifact according to the change to the at least one attribute of the artifact;
    select a second collaboration system to host the artifact;
    remove the artifact from the first collaboration system; and
    upload the artifact to the second collaboration system.

* * * * *